(12) United States Patent
Bose

(10) Patent No.: US 8,176,153 B2
(45) Date of Patent: May 8, 2012

(54) VIRTUAL SERVER CLONING

(75) Inventor: Patrick Glen Bose, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 992 days.

(21) Appl. No.: 11/743,537

(22) Filed: May 2, 2007

(65) Prior Publication Data

US 2007/0258388 A1 Nov. 8, 2007

Related U.S. Application Data

(60) Provisional application No. 60/746,253, filed on May 2, 2006.

(51) Int. Cl.
*G06F 15/177* (2006.01)
(52) U.S. Cl. ........ 709/222; 709/213; 709/223; 709/226; 370/254; 713/1; 718/1; 718/105
(58) Field of Classification Search .................. 709/223, 709/226; 370/254; 713/1; 718/1, 105
See application file for complete search history.

(56) References Cited

U.S. PATENT DOCUMENTS

| | | | | |
|---|---|---|---|---|
| 6,308,315 B1 * | 10/2001 | Dice et al. ..................... | | 717/106 |
| 6,421,711 B1 | 7/2002 | Blumenau et al. | | |
| 6,631,395 B1 | 10/2003 | Chessell | | |
| 6,801,949 B1 | 10/2004 | Bruck et al. | | |
| 7,069,296 B2 | 6/2006 | Moller et al. | | |
| 7,076,801 B2 | 7/2006 | Gong et al. | | |
| 7,111,300 B1 | 9/2006 | Salas et al. | | |
| 7,213,065 B2 | 5/2007 | Watt | | |
| 7,356,679 B1 * | 4/2008 | Le et al. ............................ | | 713/1 |
| 7,366,742 B1 * | 4/2008 | Umbehocker et al. ................ | | 1/1 |
| 7,379,990 B2 | 5/2008 | Tsao | | |
| 7,546,354 B1 | 6/2009 | Fan et al. | | |
| 7,747,816 B1 | 6/2010 | Nourmohamadian et al. | | |
| 2002/0001307 A1 | 1/2002 | Nguyen et al. | | |
| 2002/0165961 A1 | 11/2002 | Everdell et al. | | |
| 2002/0188870 A1 | 12/2002 | Gong et al. | | |
| 2003/0005028 A1 | 1/2003 | Dritschler et al. | | |
| 2003/0018927 A1 | 1/2003 | Gadir et al. | | |
| 2003/0217131 A1 * | 11/2003 | Hodge et al. .................. | | 709/223 |
| 2004/0054725 A1 | 3/2004 | Moller et al. | | |
| 2004/0236633 A1 | 11/2004 | Knauerhase et al. | | |
| 2005/0120160 A1 | 6/2005 | Plouffe et al. | | |
| 2005/0262505 A1 | 11/2005 | Esfahany et al. | | |
| 2006/0107087 A1 * | 5/2006 | Sieroka et al. .................... | | 714/4 |
| 2006/0114917 A1 | 6/2006 | Raisch | | |
| 2006/0143617 A1 | 6/2006 | Knauerhase et al. | | |
| 2006/0294516 A1 * | 12/2006 | Winner et al. .................... | | 718/1 |
| 2007/0027973 A1 | 2/2007 | Stein et al. | | |

(Continued)

OTHER PUBLICATIONS

"U.S. Appl. No. 11/692,736, Final Office Action mailed Mar. 28, 2011", 22 pgs.

*Primary Examiner* — Thuong Nguyen

(74) *Attorney, Agent, or Firm* — Schwegman, Lundberg & Woessner, P.A.

(57) ABSTRACT

In one embodiment, a system preparation application may be executed on a source storage device to prepare a reference system for image creation. The reference system may include at least one application for customization. The image of the prepared reference may be automatically deployed to a target storage device. The target storage device may be associated with a virtual server. Customization data may be written to the target storage device.

20 Claims, 9 Drawing Sheets

U.S. PATENT DOCUMENTS

| | | |
|---|---|---|
| 2007/0067435 A1 | 3/2007 | Landis et al. |
| 2007/0234334 A1* | 10/2007 | Araujo et al. ................. 717/168 |
| 2007/0234337 A1* | 10/2007 | Suzuki et al. ................. 717/168 |
| 2007/0250608 A1 | 10/2007 | Watt |
| 2007/0283015 A1 | 12/2007 | Jackson et al. |
| 2007/0297428 A1 | 12/2007 | Bose et al. |
| 2007/0299906 A1 | 12/2007 | Bose et al. |
| 2009/0282404 A1* | 11/2009 | Khandekar et al. ............... 718/1 |
| 2010/0228840 A1 | 9/2010 | Bose et al. |

* cited by examiner

VIRTUAL SERVER CLONING

PRIORITY CLAIM

This application claims the priority benefit of U.S. Provisional Application No. 60/746,253, filed 2 May 2006, the entire content of which is incorporated herein by reference.

TECHNICAL FIELD

This application relates generally to data processing systems and networking. More particularly, the present disclosure relates to the field of virtual servers.

BACKGROUND

To perform virtual server cloning, an administrator installs and configures a reference system. This reference system is then shutdown, and a copy is made of the reference system. The copy can either be kept in an image form for later use, or the copies can be made directly to the target storage, for example by using a disk duplicator. The copy is often block-based, or for more sophisticated tools, may be file based. The copied system is then booted and customizations are manually made to that system to differentiate it. Typically, when a manual method is used for cloning servers, the desired installation and configuration is not documented. The manual method for cloning is expensive due to the cost of labor, does not scale well, and tends to be error prone.

Changes to a virtual server's installation and/or configuration are part of the normal server management lifecycle. Typically, the way to propagate a change made to a virtual server's image or configuration is to redeploy the image to the affected virtual server. This is a resource intensive task, as it will often involve writing tens to hundreds of gigabytes of data, depending on the size of the storage devices and the number of servers. This is a relatively expensive process for implementing minor changes. Alternatively, an administrator could make the changes manually to each affected server, however, this process does not scale and tends to be error prone.

Another conventional approach for changing the configuration of a virtual server is installing a host agent on the virtual server to receive instructions from a managing device to change or update a particular configuration property. However, this approach consumes resources used by the virtual server. Also, in a secured environment, this approach requires extra network configurations to provide a secure communications channel between the managing device and the virtual server. Therefore, this may present a potential security hazard, and adds another element of complexity in the system.

If an image of a reference virtual server needs to be copied to multiple virtual servers, the reference virtual server can be cloned by copying the image and deploying the image to the multiple servers. The deploy operation is typically done sequentially. That is, the image is read, decompressed, and written to one of the virtual servers. When done, the next virtual server is deployed, again, by reading, decompressing, and writing the same data.

Usually, the only difference for subsequent virtual servers being deployed is the destination of the data. Consequently, virtual server cloning is an expensive operation due to the amount of data that must be read and written.

BRIEF DESCRIPTION OF DRAWINGS

Embodiments of the invention are illustrated by way of example, and not limitation, in the figures of the accompanying drawings, in which like reference numerals indicate the same or similar features unless otherwise indicated.

In the drawings.

OVERVIEW

Methods and systems for virtual server cloning are described. In an example embodiment, a system preparation application may be executed on a source storage device to prepare the reference system for image creation. The source storage device may include a reference system. The reference system may include at least one application for customization. An image of the prepared reference system may be created. The image may be automatically deployed to a target storage device. The target storage device may be associated with a virtual server. Customization data may be automatically written to the target storage device.

In an example embodiment, a reference system including at least one application may be accessed on a target storage device. The target storage device may be associated with a virtual server. Recustomization data may be written to the target storage device and the target storage device with the physical server.

DESCRIPTION OF EXAMPLE EMBODIMENTS

In the following description, for purposes of explanation, numerous specific details are set forth in order to provide a thorough understanding of example embodiments. It will be evident, however, to one skilled in the art that the present invention may be practiced without these specific details.

Figure 1:
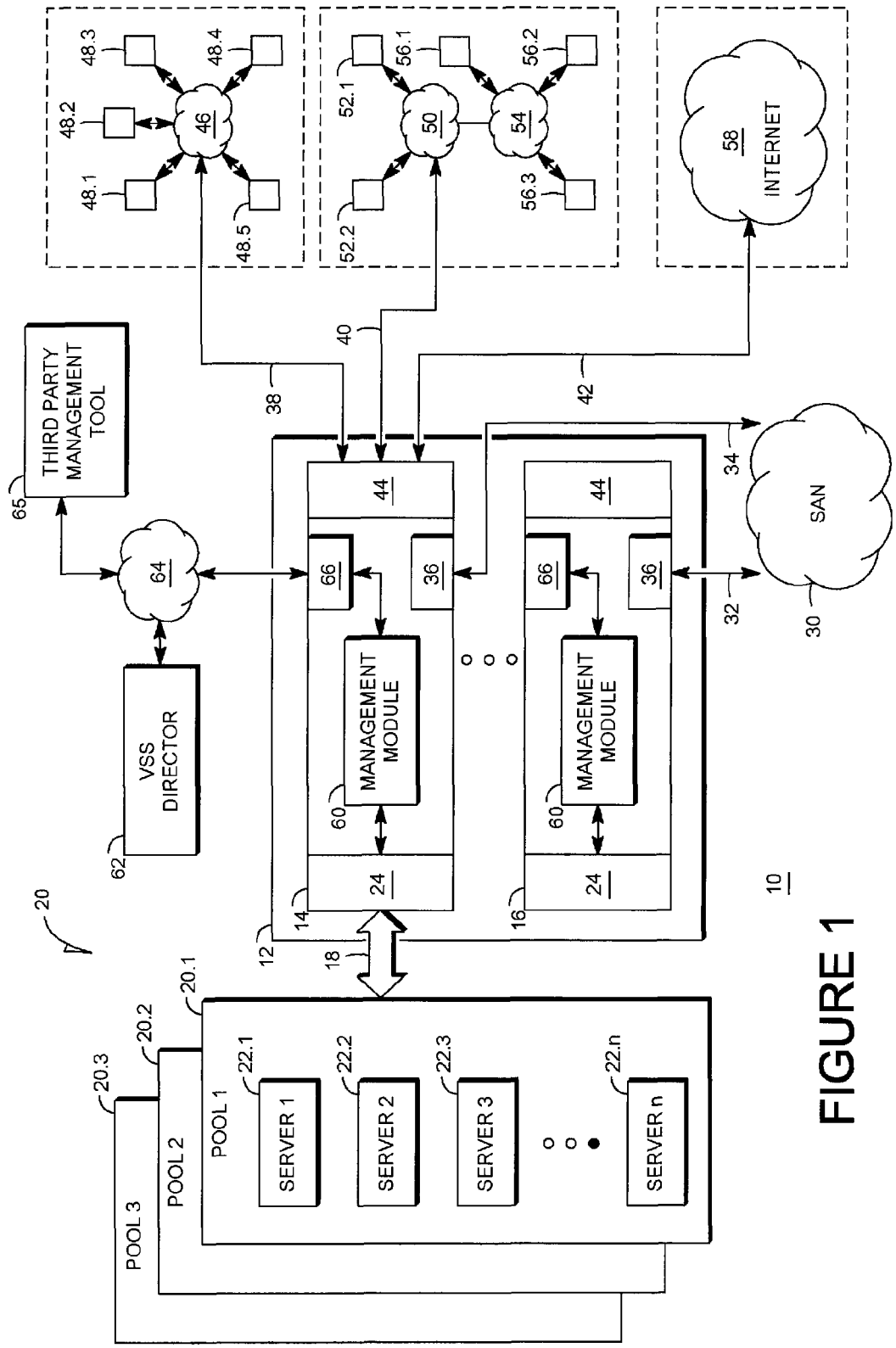
FIG. 1 is a block diagram of example architecture of a virtual server system.

FIG. 1 generally illustrates a virtual server system 10 (herein referred to by way of example as a "VSS") with associated hardware on which one or more virtual servers are deployed. The virtual server system 10 allows server personalities to be assigned to generic static servers over a server fabric switch, however server personalities may also be assigned to other servers. The virtual server system 10 may be a VFRAME system available from Cisco Systems Inc., or any other virtual server system.

In an example embodiment, as the server personality is disembodied or separated from the physical structure, it may be possible to provision virtual servers on-demand out of industry standard components to enable differing configurations of virtual servers without reconfiguring the server. Each virtual server deployed on a physical server defines a state of a physical server. This may include the logical definitions and configuration information stored in, and used by, a VSS director (described by way of example in more detail below) to program a server fabric, an Operating System (OS), and applications of the virtual server. The state may be stored on a logical unit on a Storage Area Network (SAN) 30, as described in more detail below. Thus, in FIG. 1, the example physical servers 22.1-22.n are the physical devices on which one or more virtual servers run. These physical servers include a CPU, memory, IO devices, and the like.

The system 10 is shown, by way of example, to include a switch group 12 including one or more switches 14, 16. The switch group 12 is connected, for example, via an InfiniBand link 18 (e.g., a switched fabric communications link) to one or more server pools 20. Each server pool 20.1-20.3 is shown to include a plurality of physical servers 22.1-22.n linked via one or more InfiniBand links 18 to the switch group 12. By way of example, three physical server pools 20.1-20.3 (on which the virtual servers are deployed) are shown in FIG. 1 but any number of server pools may be provided. Each server pool may have a different number of servers.

When the link 18 is an InfiniBand link, each switch 14 may include an InfiniBand interface 24 to interface the server pools 20.1-20.3 to the switch group 12. The InfiniBand architecture or link may define a high speed network for interconnecting processing nodes and I/O nodes. In an InfiniBand network, processing nodes and I/O nodes are connected to the fabric by Host Channel Adapters (HCAs) and Target Channel Adapters (TCAs). Other links may be provided in addition to, or instead of, the InfiniBand link 18.

Figure 2:
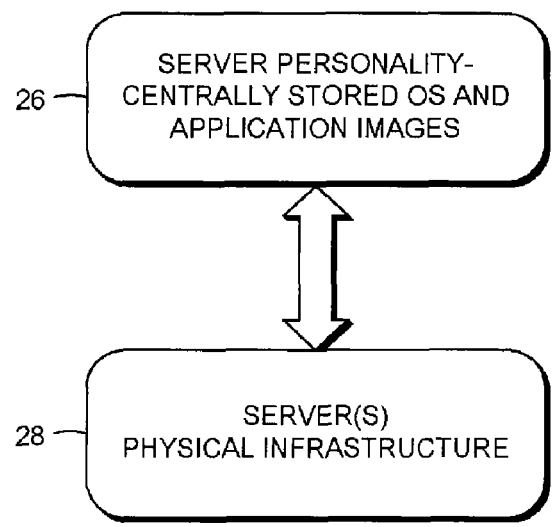
FIG. 2 is a block diagram showing separation of the physical infrastructure from the server personality of a server of the system of FIG. 1.

FIG. 2 shows the personality of each server 22.1-22.n disembodied or separated from the physical servers or infrastructure (see blocks 26 and 28 in FIG. 2). The server personality may describe the function or configuration of the virtual server. For example, the personality of the servers 22.1-22.n (e.g., the OS, application image(s), or the like) may be stored remotely from the physical server infrastructure on the SAN 30 (see FIG. 1).

In this example embodiment, the physical server infrastructure may be stateless computational resources with CPUs and memory. For example, as shown in FIG. 1, the SAN 30 (including one or more databases) may be provided to operate in conjunction with the physical servers 22.1-22.n. It will be appreciated that the SAN 30 may be a distributed data facility dispersed geographically. In an example embodiment, the SAN 30 may be connected to the example switches 14, 16 via fibre channel connections 32, 34. Accordingly, each switch 14, 16 may include a fibre channel gateway 36. In other embodiments, the switches 14, 16 may communicate with the SAN 30 via other channels in addition to, or instead of, the fibre channel gateway 36. The personalities or state of the virtual servers may be stored in a local database or on the SAN 30.

The switch 14 communicates with a plurality of different networks (Local Area Networks, Wide Area Networks, or the like) via communication links 38, 40, 42. For example, the communication links 38, 40, 42 may be Ethernet connections and, each switch 14, 16 may include one or more Ethernet gateways 44. In the example system 10, the communication link 38 is shown to connect to a network 46 interconnecting a plurality of hosts 48.1-48.5. The hosts 48.1-48.5 may form part of another data network, or be any other network host.

The switch 14 also communicates via the communication link 40 to a network 50 which may, for example, be an enterprise network. The network 50 communicates with desktop computers 52.1-52.2 and a subnet 54 which, in turn, is connected to desktop computers 56.1-56.3. Further, the switch 14 connects via the communication link 42 to a network such as the Internet 58. The aforementioned networks are merely example networks and different configurations, and different numbers of networks and subnets may be provided that connect a wide range of network devices.

The system 10 may allow virtualization of servers deployed on physical servers to be managed by a management module 60. The management module 60 may be provided at the switch 14 or in other components. The management module 60 communicates with a VSS director 62 that controls the provisioning of the server pools 20.1-20.3.

In an example embodiment, the VSS director 62 communicates via a network 64 with the management module 60. The system 10 also includes a third party management module 65 that communicates with the VSS director 62 and/or with the management module 60 to manage the provisioning of virtual servers. In an example embodiment, the network 64 is an Ethernet network and, accordingly, the switch 14 may thus include one or more Ethernet ports 66. However, the various communication links linking the various components/devices in the system 10 are not restricted to InfiniBand connections, Ethernet connections, or the like. Any communication means may be provided to interconnect the various components.

Figure 3:
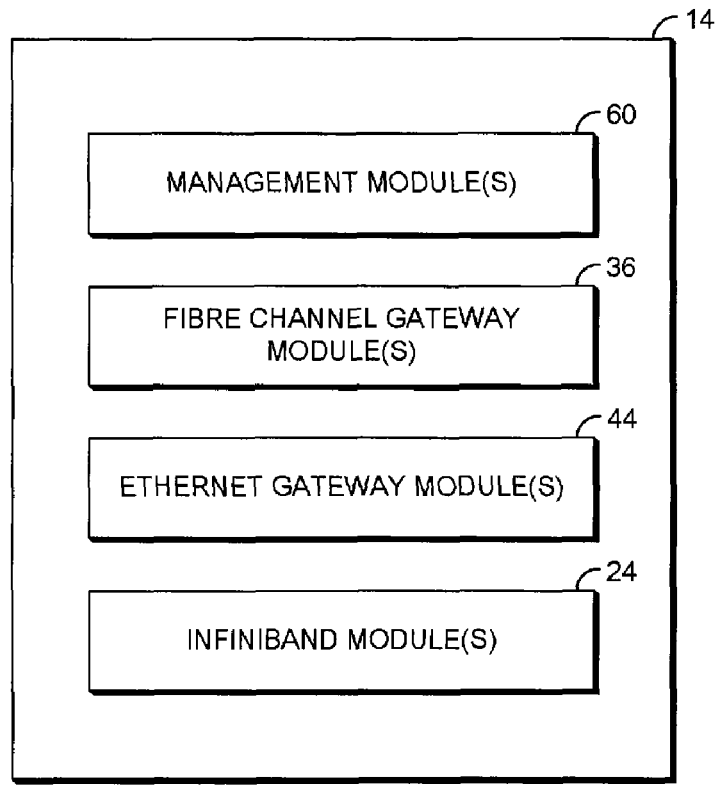
FIG. 3 is a block diagram of an example switch deployed in the system.

FIG. 3 shows example modules of the switch 14. The switch 14 may include one or more management modules 60, one or more fibre channel gateway modules 36, one or more Ethernet gateway modules 44, and one or more InfiniBand modules 24. The modules 60, 36, 44, and 24 may include various electronic components to effect communication using the relevant protocols. In an example embodiment, the VSS director 62 of the system 10 allows software partners to program the switches 14, 16 with policies necessary to implement virtual servers on demand. For example, the third party management tool 65 may be used to accomplish this.

Figure 4:
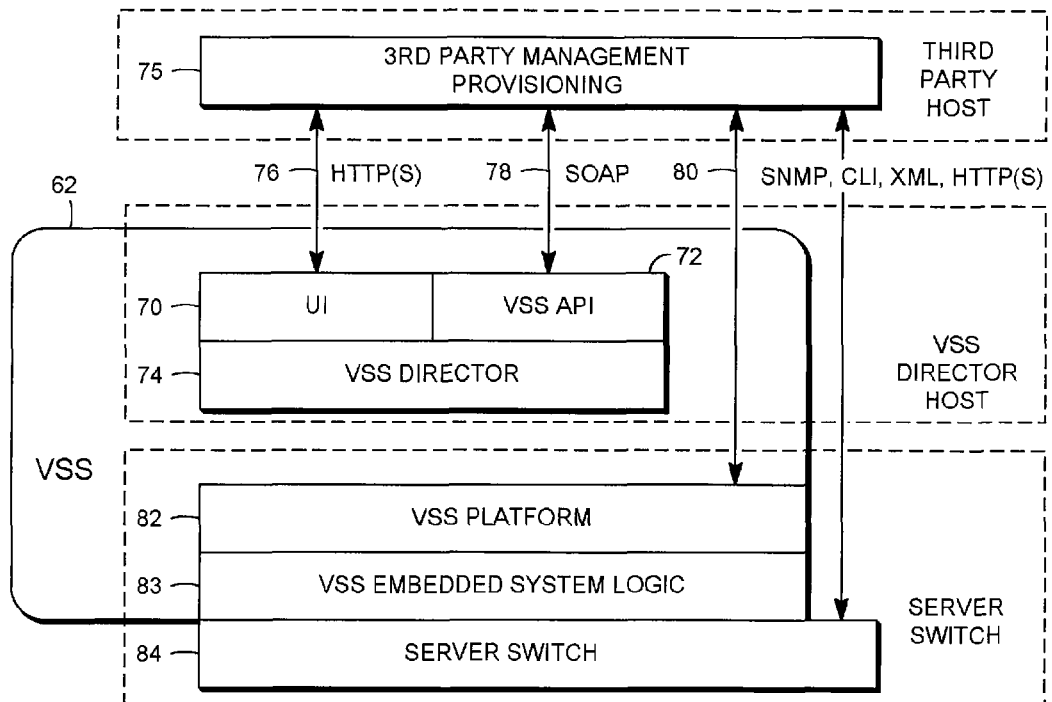
FIG. 4 is a block diagram of example software architecture of a management module communicating with a third party management tool.

As shown by way of example in FIG. 4, the VSS director 62 (which may reside on a separate server) may logically include a user interface module 70, a VSS director Application Program Interface (API) 72 and a VSS director platform 74. The VSS director 62 may communicate with a third party management and provisioning module 75 (e.g., may correspond to the third party management tool 65 in FIG. 1) via, for example, the network 64. In an example embodiment, the user interface module 70 communicates with the third party management and provisioning module 75 via an HTTP(s) link 76, a SOAP link 78, or the like. The third party management and provisioning module 75 may also communicate via link 80 to a VSS platform 82. The server switch 14 also may include embedded system logic 83 provided at a switch 84 (e.g., a switch 14, 16).

Figure 5:
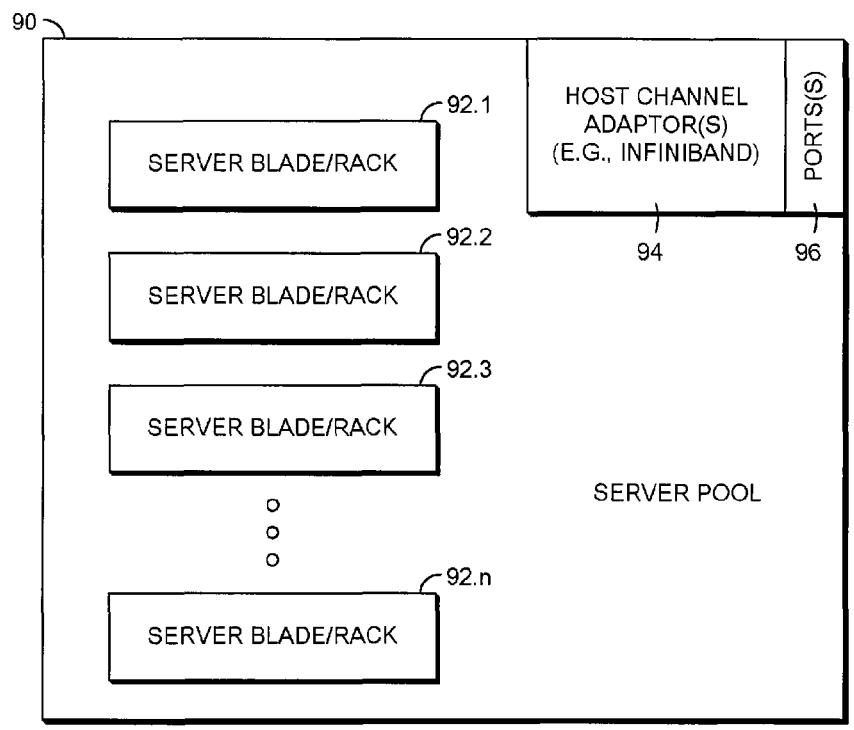
FIG. 5 is a block diagram of an example physical server pool of the system of FIG. 1.

FIG. 5 shows an example physical server pool 90. The server pool 90 is shown to include a plurality of physical servers (e.g., server blades) 92.1-92.n. Each of the servers 92.1-92.n may host one or more virtual servers. The servers 92.1-92.n may correspond to the servers 22.1-22.n in FIG. 1. In an example embodiment, in order to communicate via the communication link 18, each server pool 90 includes one or more host channel adapters (HCA) 94 (e.g., one or two HCAs per physical server) when deployed in an InfiniBand environment. However, other adapters and configurations may be used in different environments. Further, one or more ports 96 may be provided for communication via further communication protocols or channels. As mentioned above, the servers 92.1-92.$n$ are physical servers. The virtual servers hosted on the physical servers may be defined by network configuration and/or logical definitions stored in a database of the VSS director 62 and by a server state which is stored on networked storage.

Figure 6:
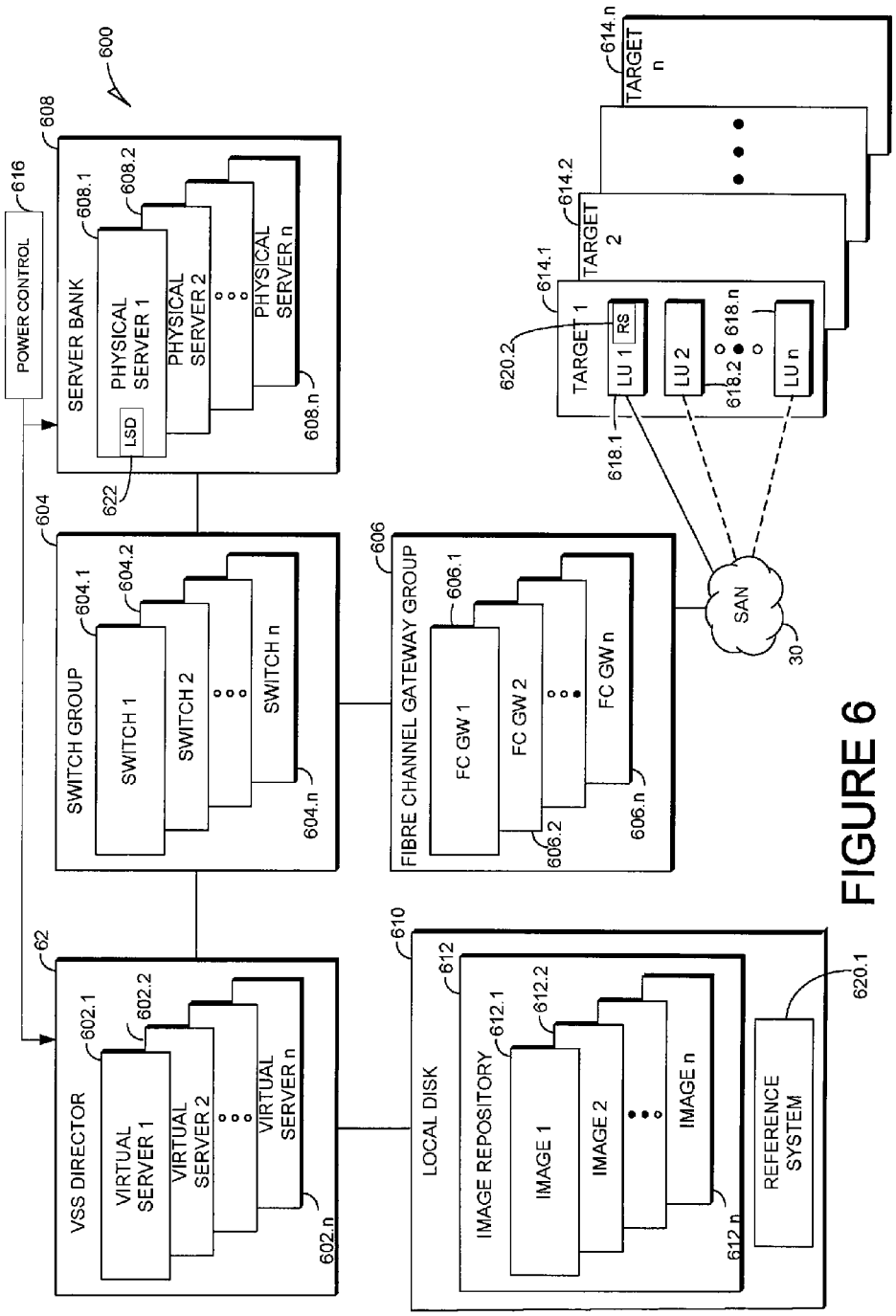
FIG. 6 is a block diagram of an example virtual server system.

FIG. 6 illustrates an example virtual server system 600 to manage and provision (e.g., clone) a server configuration. Various components of the system 600 correspond to the system 10 shown in FIG. 1.

The system 600 includes the VSS director 62 (see FIG. 1). A virtual server group 602, which includes one or more virtual servers 602.1-602.$n$, may be implemented on the VSS director 62. A server bank 608 is provided and may include one or more physical servers 608.1-608.$n$. Each of the physical servers may include one or more local storage devices 622 (e.g., a local disk), to which a reference system may be deployed and/or customized.

The system 600 may also include the SAN 30 (see FIG. 1) including target memory devices 614.1-614.$n$. Each target memory device 614.1-614.$n$, such as target memory device 614.1, includes one or more logical units (LUs) 618.1-618.$n$. In an example embodiment, each LU 618.1-618.$n$ serves as a memory location for a virtual server. A local disk 610 may be a memory device for the VSS director 62, and may have an image repository 612 that includes one or more images 612.1-612.$n$. However, the image repository 612 in an example embodiment may be located at another location, such as at the SAN 30. The VSS director 62, the server bank 608, and the SAN 30 may be interconnected through a switch group 604 (which is shown by way of example to include switches 604.1-604.$n$) and a fibre channel gateway (FC GW) group 606 (which includes FC GWs 606.1-606.$n$). A power control 616 may provide power directly to the VSS director 62 and the server bank 608.

A reference system 620 may be created on the local disk 610 as a reference system 620.1 and/or on a LUs 618.1-618.$n$ as a reference system 620.2. The reference system 620.1, 620.2 may be deployed to a target storage device (e.g., a local disk 610 or a LU 618) as described in greater detail below.

Figure 7:
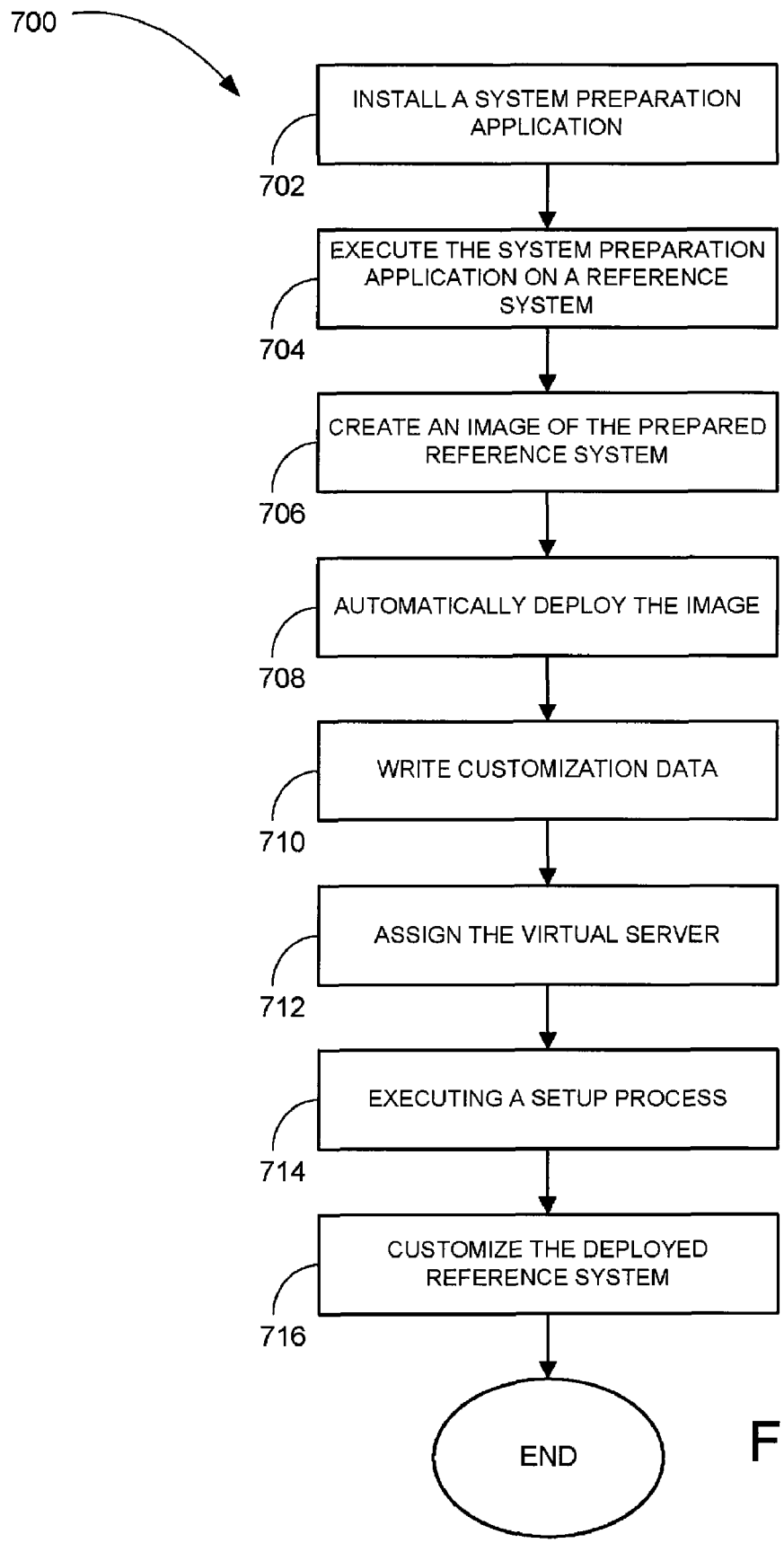
FIG. 7 is a flowchart illustrating a method, in accordance with an example embodiment, for cloning a server.

FIG. 7 illustrates a method 700, in accordance with an example embodiment, for cloning a virtual server. The cloned virtual server may be created and deployed in the virtual server system 10 on the SAN 30 or the virtual server system 600 on the SAN 30 and/or the local disk 622 of the physical server 608 (see FIGS. 1 and 6), or in any other virtual server systems. The method 700 may be performed by the VSS director 62 or another resource of the virtual server system.

The cloning of a virtual server by performing the method 700 may reduce the time associated with cloning because of a reduction in an amount of human interaction required to clone the virtual server. The method 700 may be performed by a VSS director 62 (e.g., as may already exist in a system for dynamic mapping) instead of a server, thereby saving resources as no additional servers may be needed to perform the cloning.

A system preparation application may be installed on a source storage device accessible by the VSS director 62 at block 702. The source storage device may be accessible through direct storage access and may be a networked memory area (e.g., the LU 618.1-618.$n$) on the SAN 30 or a local storage device 608 of a physical server (e.g., the local disk 622).

The source storage device may include a reference system 620, which may include an operating system and/or other applications that may be installed or otherwise available for customization on the source storage device. For example, an application of the reference system may include WINDOWS operating system by Microsoft Corporation.

The system preparation application may be executed on the reference system 620 as part of a setup process to prepare the reference system 620 for image creation at block 704. The system preparation application may enable automated installation (e.g., without human intervention) of the applications of the reference system 620 when deployed during setup. In an example embodiment, the system preparation application removes customized data contained in the reference system 620 while incorporating a hook to be run upon execution of a set process for the reference system 620 that enables the reference system 620 to be customized for a particular deployment. The system preparation application may be Sysprep by Microsoft Corporation, however other system preparation applications may also be used.

An image of the prepared reference system 620 may be created at block 706. The image may be a compressed version of the prepared reference system that may act as a master copy for deployment. The image may be stored in the image repository 612 (see FIG. 6) or in another location (e.g., the LU 618.1-618.$n$).

In an example embodiment, the VSS director 62 may create an image of the prepared reference system by making a bit-by-bit copy of the reference system, compressing the bit-by-bit copy to create an image, and storing the image and any metadata associated with the image (e.g., in the image repository 612 as an image 612.1).

The image may be automatically (e.g., without human intervention) deployed to a target storage device at block 708. The deployment may include a full, bit-by-bit copy of the image. The target storage device may already be associated with a virtual server, or a virtual server may be created and associated with the target storage device. The association of the target storage device with the virtual server may prevent another virtual server from using the same target storage device.

The target storage device may be the first networked memory area or a second networked memory area (e.g., a LU) on a SAN or a local storage device 622 of the first physical server or a second physical server. The target storage device is the location whether the newly deployed reference system 620 may be customized for use. The local storage device 622 may, by way of example, be a direct access storage device available to a physical server.

The target storage device may include, prior to image deployment, an operating system and/or other applications. Any existing applications on the target storage device may be overwritten during deployment.

In an example embodiment, a user may select from among a plurality of available images (e.g., such as from the image repository 612) for deployment. The selection of the image may be based on a desired reference system 620 for installation.

The image may optionally be deployed in parallel to a plurality of target storage devices (e.g., the target storage device and one or more additional storage devices). The parallel deployment may increase the speed of image deployment. The parallel deployment may not have for hosts available with the plurality of target storage devices to perform the deployment thereby increasing the scalability of image deployment. The parallel deployment may not need the physical servers to be available with the plurality of target storage devices to perform the deployment thereby increasing the scalability of image deployment. By way of example, the parallel deployment may use multi-threading and/or time slicing.

The parallel deployment may reduce the load on the VSS director 62 as the number of times an image is read from a memory location may be reduced from n times (for n virtual servers) to 1, and also because the VSS director 62 decompresses the image once (instead of n times).

The customization data may be written automatically or dynamically (e.g., reperformed as desired) to the target storage device at block 710. The customization data may be, for example, an answer file or a customization script. The answer file may be a sysprep.inf file or other file that may be used by the installed version of the system preparation application during automatic customization. The customization script may be used for installation of additional applications or customization by the system preparation application during dynamic customization or by the virtual server system 10, 600 at another time. The customization script may, by way of an example, configure an IP address, a netmask, and/or gateways of network interfaces. In an example embodiment, the target storage device may be mounted prior to writing customization data and unmounted upon completion.

The customization data may be defined by interpolating values from the image, a virtual server group and/or a virtual server into an answer file. The customization data may be used to customize a deployed reference system as described in greater detail below.

The virtual server may be assigned to the target storage device at block 712 to enable the virtual server to be available within the virtual server system 10, 600. The visual server assignment may cause the target storage device to be associated with a physical server, the physical server to be powered on (block 714), and a setup process to executed (block 714). Once the virtual server assigned, the target storage device may not be assignable to another virtual server until the virtual server has been unassigned.

The setup process may run automatically when the physical server is powered on and may initiate the running of a setup wizard application to create a deployed system from the reference system of the deployed image. The setup process prepares the deployed system for installation on the target storage device.

The deployed system may be automatically customized without human interaction using the customization data at block 716. For example, a setup wizard initiated during the operations of block 714 may use the customization data to automatically customize the deployed system at block 716.

Upon completion of the operations at block 716, a unique fully deployed server may be available for processing server requests. Customization of the deployed system may enable a system similar to the reference system to be deployed within a network or elsewhere. The deployed system may be customized so that its operations do not interfere with the operations of the reference system or another deployed system. For example, the customized system may have a different host name and/or may be located at a different internet protocol (IP) address in the network from another deployed system to avoid collisions on a network.

In an example embodiment, the virtual server may be disconnected from the target storage device, access to the target storage device may be removed, recustomization data may be written (e.g., automatically written or dynamically written) to the target storage device, and the deployed reference system may be recustomized using the recustomization data.

In an example embodiment, the optional parallel deployment of the image during the operations at block 708 may include the VSS director 62 copying data from an image 612.1 in the image repository 612 to a plurality of the LUs 618.1-618.$n$ (e.g., depending on how many images are required) of target memory device 614.1. The VSS director 62 may then create and use a read thread to read the image 612.1 and to function as a control thread. The VSS director 62 may also create and use write threads to write to the memory locations for the virtual servers 602.1-602.$n$ to be deployed, which in this example embodiment are the LUs 618.1-618.$n$ of the target memory device 614.1. The read thread may allocate buffers within the VSS director 62. The VSS director 62 may establish a connection to the local disk 610 to gain access to the image 612.1 (or any other image to be read) in the image repository 612. The read thread may read a first chunk (data block) of data of the image 612.1 in the image repository 612, decompresses the data chunk, and thereafter store the decompressed data in the memory buffer.

The read thread may signal the write threads to start writing, in parallel, the data from the buffer to the LUs 618.1-618.$n$ of the target memory device 614.1. The read thread may then read the next chunk of compressed image 612.1 from the image repository 670, decompresses it, and then store it in a second memory buffer. Thereafter, the read thread may wait for the write threads to indicate that they have completed writing from the memory buffers to the LUs 618.1-618.$n$ before fetching the next chunk of data to be written.

The read thread may signal the write threads to start writing from the buffer. The read thread may read the next chunk of the image 612.1, decompresses it, store it in a memory buffer, and wait for the writer threads to indicate that they have completed writing from a buffer to the LUs 618.1-618.$n$ of target memory device 614.1. The read thread may repeat the above functionality until the entire image is completely decompressed and deployed to the LUs 618.1-618.$n$. At this point, each LU 655.1-655.$n$ may have the same information. Thus, a single read thread may be associated with multiple write threads and the virtual servers may thus be cloned in parallel.

Figure 8:
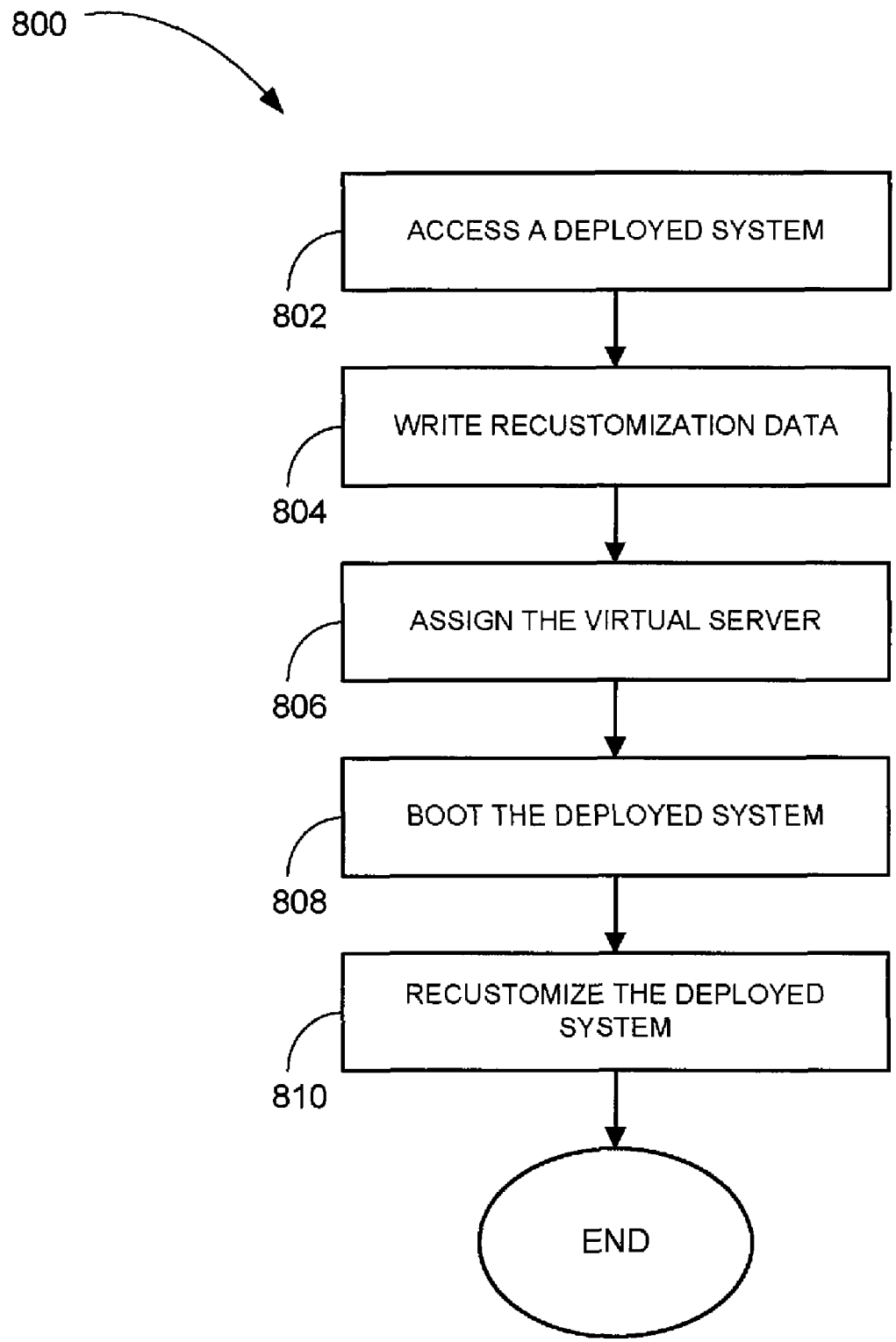
FIG. 8 is a flowchart illustrating a method, in accordance with an example embodiment, for recustomizing a virtual server.

FIG. 8 illustrates a method 800, in accordance with an example embodiment, for recustomizing a virtual server. The method 800 may be performed by the VSS director 62 (see FIG. 1) when a system (e.g., a server in the server bank 608) with a virtual server is booted, when the physical server is not associated with the virtual server, when requested by a user, or otherwise performed. The recustomization performed by the method 800 may automatically modify a server property while avoiding erasing other data associated with a deployed system.

The virtual server may be recustomized by performing the method 800 without redeploying an image. Rewriting the customization data without re-performing, for example, the bit-by-bit copy may save installation time. In addition, when the bit-by-bit copy is not performed during recustomization, other data that may accumulate on the system since its original deployment may be retained.

In the method 800, a reference system on a target storage device associated with a physical server may be accessed at block 802. The target storage device may be the first networked memory area or a second networked memory area (e.g., a LU) on a SAN or a local storage device 822 of the first physical server or a second physical server. The target storage device may optionally be mounted upon completion of the operations at block 802.

Recustomization data may be written (e.g., dynamically or automatically) to the target storage device at block 804. The recustomization data may be a version of customization data with at least one modified property.

The virtual server may be assigned to the physical server device at block 806, and the reference system may be booted at block 808. The reference system may be recustomized using the recustomization data at block 810. In an example embodiment, recustomizing the reference system may optionally include unas signing the virtual server from the target storage device and adding access by the VSS director 62 to the target storage device prior to the operations at block 810.

Figure 9A:
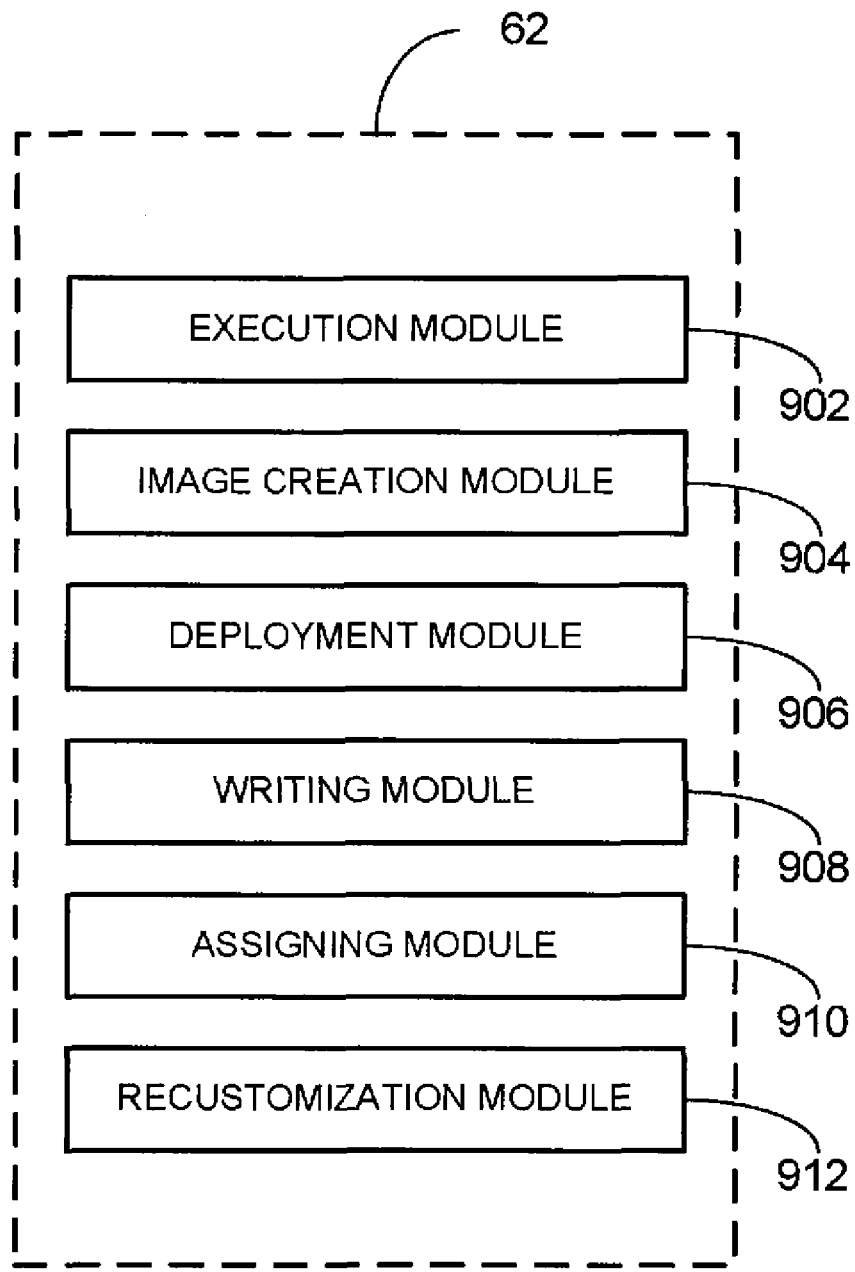
FIG. 9A is a block diagram of an example director that may be deployed in the virtual server systems of FIG. 1 or FIG. 6.

FIG. 9A illustrates an example VSS director 62. The VSS director 62 may be deployed within the virtual server system 10 (see FIG. 1) or within another server system.

The director 900 may include a number of modules or sub-modules including an execution module 902, an image creation module 904, a deployment module 906, a writing module 908, an assigning module 910, and/or a recustomization module 912. These modules may be implemented in hardware or software, or a combination thereof and perform the functionality of the methods 700 and 800.

The execution module 902 is configured to execute a system preparation application on a source storage device to prepare the reference system for image creation. The image creation module 904 is configured to create an image of the prepared reference system. The deployment module 906 is configured to automatically deploy the image to a target storage device, the target storage device associated with a virtual server.

The writing module 908 is configured to automatically write customization data to the target storage device. The assigning module 910 assigns the virtual server to the target storage device. The recustomization module 912 is configured to write recustomization data to the target storage device.

Figure 9B:
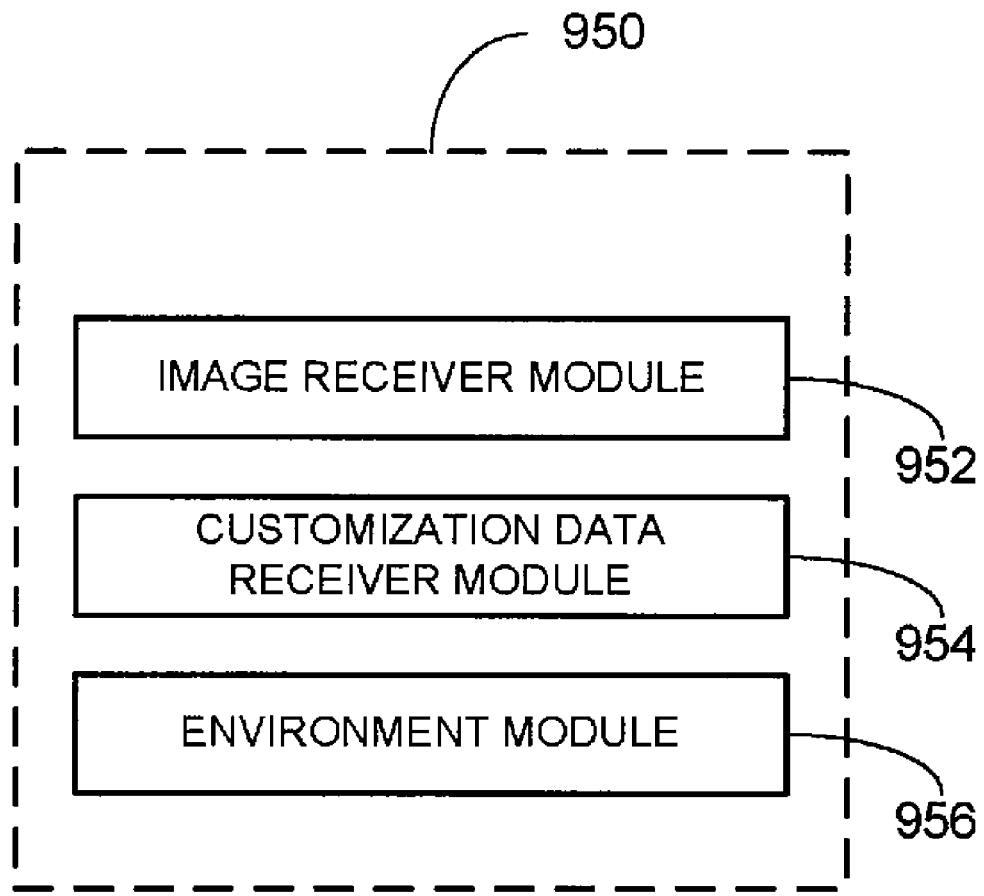
FIG. 9B is a block diagram of a target storage device that may be deployed in the virtual server systems of FIG. 1 or FIG. 6.

FIG. 9B illustrates an example target storage device 950 that may be deployed within the virtual server system 10 (see FIG. 1) or within another server system.

The target storage device may include a number of modules or sub-modules including an image receiver module 952, a customization data receiver module 954, and/or an environment module 956. These modules may be implemented in hardware or software, or a combination thereof and perform the functionality of the methods 700 and 800.

An image receiver module 922 is configured to receive an image from the deployment module 906. A customization data receiver module 954 is configured to receive the customization data from the writing module 908.

An environment module 956 is configured to provide an environment for creation of a deployed reference system from the reference system of the image and customization of the deployed system using customization data.

Figure 10:
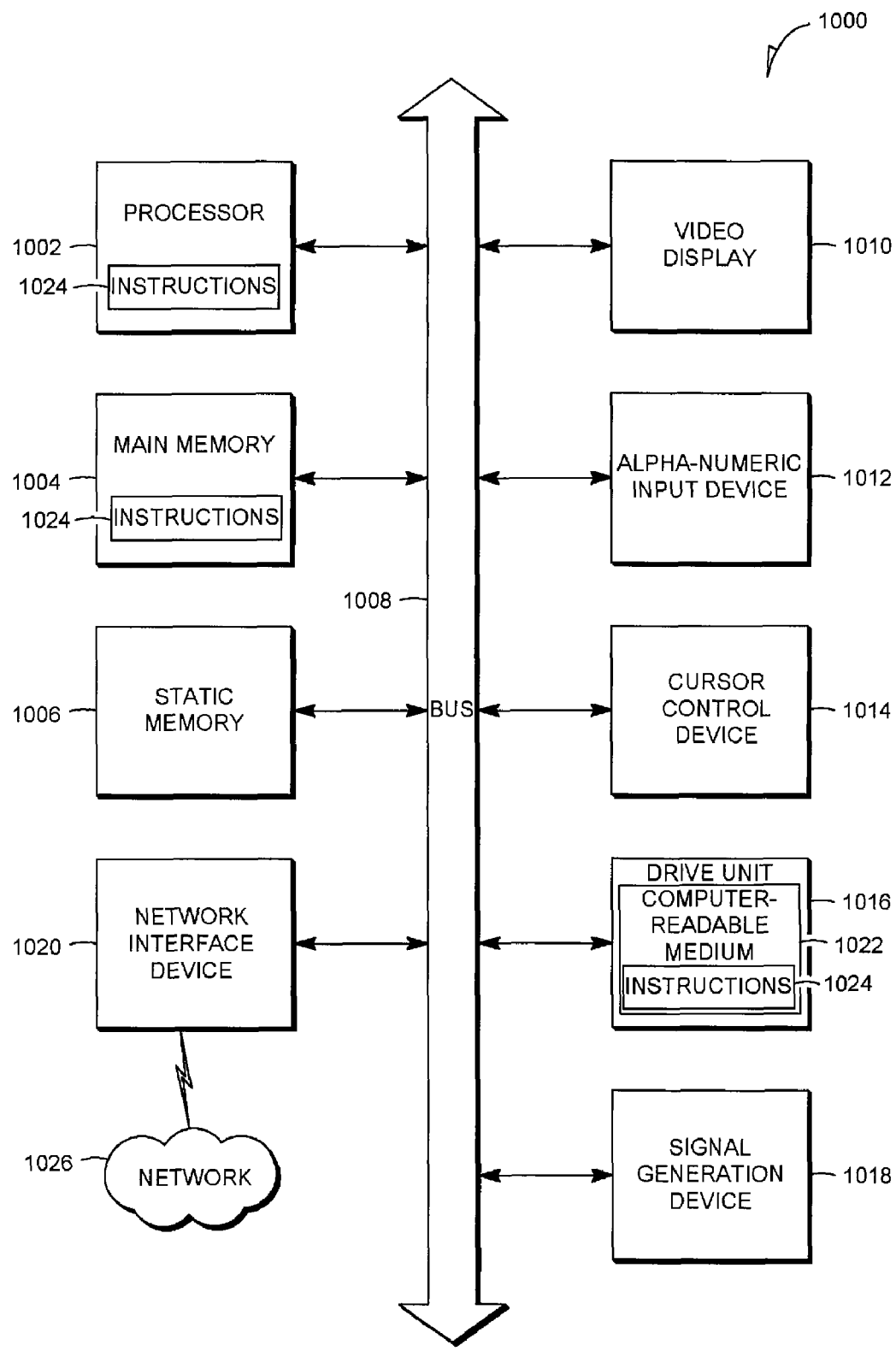
FIG. 10 shows a diagrammatic representation of machine in the example form of a computer system within which a set of instructions, for causing the machine to perform any one or more of the methodologies discussed herein, may be executed.

FIG. 10 shows a diagrammatic representation of machine in the example form of a computer system 1000 within which a set of instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or as a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 1026 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform anyone or more of the methodologies of the present invention. The term "machine-readable medium" shall accordingly be taken to include, but not be limited to, solid-state memories, and optical and magnetic media.

Although example embodiments of the present invention have been described with reference to specific example embodiments, it will be evident that various modifications and changes may be made to these embodiments without departing from the broader spirit and scope of the invention. Accordingly, the specification and drawings are to be regarded in an illustrative rather than a restrictive sense.

What is claimed is:

1. A method comprising:
    executing, on a source storage device that includes a reference system, a system preparation application to prepare the reference system for image creation, the reference system including at least one application for customization;
    creating an image of the prepared reference system;
    automatically deploying the image to a target storage device;
    assigning a virtual server to the target storage device, the assigning causing the target storage device to be associated with a physical server, the physical server to host the virtual server;
    writing customization data to the target storage device, wherein the customization data comprises a customization script used to customize the at least one application;

writing recustomization data to the target storage device, the writing of the recustomization data occurring without redeploying of the image to the target storage device; and automatically recustomizing a deployed system using the recustomization data, the recustomizing comprising disassociating the virtual server with the target storage device of the deployed system and the deployed system including the physical server, wherein the automatically deploying of the image to the target storage device comprises automatically deploying the image in parallel to the target storage device and an additional storage device, the target storage device being associated with an additional virtual server.

2. The method of claim 1, wherein the creating of the image comprises:
   making a bit-by-bit copy of the reference system;
   compressing the bit-by-bit copy to create the image; and
   storing the image and any metadata associated with the image.

3. The method of claim 1, wherein the creating of the image further comprises:
   creating the virtual server on the target storage device.

4. The method of claim 1, wherein the method is performed automatically on a source storage device of a storage area network (SAN).

5. The method of claim 1, wherein the method is performed automatically on a source storage device of a local storage device of the physical server.

6. The method of claim 1, wherein the automatically deploying of the image in parallel comprises:
   initiating a plurality of read and write threads; and
   automatically deploying the image to the target storage device and the additional storage device using the plurality of read and write threads.

7. The method of claim 1, further comprising:
   executing a setup process upon booting the physical server to create the deployed system from the reference system of the deployed image; and
   automatically customizing the deployed system using the customization data.

8. The method of claim 1, wherein the writing of the recustomization data comprises:
   disassociating the target storage device with the physical server;
   providing a virtual server system director with access to the target storage device; and
   writing the recustomization data to the target storage device.

9. The method of claim 1, wherein the target storage device is a networked memory area on a Storage Area Network (SAN).

10. The method of claim 1, wherein the target storage device is a local storage device of the physical server.

11. An apparatus comprising:
   one or more hardware processors;
   a preparation module configured to execute, using the one or more hardware processors, a system preparation application on a source storage device to prepare the reference system for image creation, the source storage device including a reference system, the reference system including at least one application for customization;
   an image creation module configured to create an image of the prepared reference system;
   a deployment module configured to automatically deploy the image to a target storage device;
   an assigning module configured to assign a virtual server to the target storage device, the assigning causing the target storage device to be associated with a physical server, the physical server to host the virtual server;
   a writing module configured to automatically write customization data to the target storage device, wherein the customization data is used to customize the at least one application; and
   a recustomization module configured to:
      write recustomization data to the target storage device without redeploy of the image to the target storage device;
      disassociate the virtual server with the target storage device of the deployed system; and
      automatically recustomize a deployed system using the recustomization data, the deployed system including the physical server,
   wherein the deployment module is configured to automatically deploy the image in parallel to the target storage device and an additional storage device, the target storage device being associated with an additional virtual server.

12. The apparatus of claim 11, wherein the image creation module configured to create the image of the prepared reference system is further configured to:
   make a bit-by-bit copy of the reference system;
   compress the bit-by-bit copy to create the image; and
   store the image and any metadata associated with the image.

13. The apparatus of claim 11, wherein the deployment module configured to automatically deploy the image in parallel is further configured to:
   initiate a plurality of read and write threads; and
   automatically deploy the image to the target storage device and the additional storage device using the plurality of read and write threads.

14. The apparatus of claim 11, further comprising at least one module configured to:
   execute a setup process upon booting the physical server to create the deployed system from the reference system of the deployed image; and
   automatically customize the deployed system using the customization data.

15. The apparatus of claim 11, wherein the recustomization module configured to write the recustomization data is further configured to:
   disassociate the target storage device with the physical server;
   provide a virtual server system director with access to the target storage device; and
   write the recustomization data to the target storage device.

16. The apparatus of claim 11, wherein the target storage device is a networked memory area on a Storage Area Network (SAN).

17. The apparatus of claim 11, wherein the target storage device is a local storage device of the physical server.

18. A non-transitory computer-readable medium embodying instructions that, when executed by a computer, cause the computer to:
   execute, on a source storage device that includes a reference system, a system preparation application to prepare the reference system for image creation, the reference system including at least one application for customization;
   create an image of the prepared reference system;
   automatically deploy the image to a target storage device;

assign a virtual server to the target storage device, the assigning causing the target storage device to be associated with a physical server, the physical server to host the virtual server;

write customization data to the target storage device, wherein the customization data comprises a customization script used to customize the at least one application;

write recustomization data to the target storage device without redeploy of the image to the target storage device; and automatically recustomize a deployed system using the recustomization data, the recustomizing comprising disassociating the virtual server with the target storage device of the deployed system and the deployed system including the physical server, wherein the automatically deploying of the image to the target storage device comprises automatically deploying the image in parallel to the target storage device and an additional storage device, the target storage device being associated with an additional virtual server.

19. The non-transitory computer-readable medium of claim 18, wherein the target storage device is a local storage device of the physical server.

20. The non-transitory computer-readable medium of claim 18, further comprising instructions to:

execute a setup process upon booting the physical server to create the deployed system from the reference system of the deployed image; and automatically customize the deployed system using the customization data.

* * * * *